(12) United States Patent
Wilthorn et al.

(10) Patent No.: US 11,008,173 B1
(45) Date of Patent: May 18, 2021

(54) SPIRAL CONVEYOR DRIVE CONTROL AND LUBRICATION

(71) Applicant: John Bean Technologies AB, Helsingborg (SE)

(72) Inventors: Jack Peter Urban Wilthorn, Härslöv (SE); Ulf Göran Gramby, Bjärred (SE); Bengt Anders Gerhard Bengtsson, Helsingborg (SE); Per Martin Ström, Vinslöv (SE)

(73) Assignee: John Bean Technologies AB, Helsingborg (SE)

( * ) Notice: Subject to any disclaimer, the term of this patent is extended or adjusted under 35 U.S.C. 154(b) by 0 days.

(21) Appl. No.: 16/670,771

(22) Filed: Oct. 31, 2019

(51) Int. Cl.
*B65G 21/18* (2006.01)
*B65G 45/08* (2006.01)
*B65G 23/16* (2006.01)

(52) U.S. Cl.
CPC .............. *B65G 21/18* (2013.01); *B65G 23/16* (2013.01); *B65G 45/08* (2013.01); *B65G 2207/24* (2013.01)

(58) Field of Classification Search
CPC ........ B65G 21/18; B65G 23/16; B65G 45/08; B65G 2207/24
See application file for complete search history.

(56) References Cited

U.S. PATENT DOCUMENTS

| | | | |
|---|---|---|---|
| 3,938,651 A | 2/1976 | Alfred et al. | |
| 4,216,845 A | 8/1980 | Tashman et al. | |
| 4,565,282 A * | 1/1986 | Olsson | B65G 17/385 198/778 |
| 4,899,871 A * | 2/1990 | Olsson | B65G 21/18 198/778 |
| 5,803,232 A | 9/1998 | Fröderberg | |
| 6,523,677 B1 | 2/2003 | DeGennaro et al. | |

(Continued)

FOREIGN PATENT DOCUMENTS

| | | |
|---|---|---|
| CA | 2 356 393 A1 | 7/2000 |
| DE | 10 2010 051 283 A1 | 5/2012 |
| WO | 94/24027 A1 | 10/1994 |

OTHER PUBLICATIONS

International Search Report and Written Opinion dated Feb. 1, 2021, in corresponding International Application No. PCT/EP2020/079096, filed Oct. 15, 2020, 16 pages.

(Continued)

*Primary Examiner* — Gene O Crawford
*Assistant Examiner* — Keith R Campbell
(74) *Attorney, Agent, or Firm* — Christensen O'Connor Johnson Kindness PLLC (57) ABSTRACT

The bottom tier (24) of a conveyor belt (22) arranged in a spiral stack (26) is supported by and driven by inner and outer drive chains (28) and (30). The inner and outer drive chains are supported on and ride along support rails (32) and (34). The inner and outer drive chains are driven by a drive system (35) composed of inner and outer drive systems (36) and (38), each including a drive motor with a drive gear engaged with the inner and outer drive chains. Each of the motors is controlled by a separate variable frequency drive unit (114) and (116) which in turn are controlled by a control system (44). The control system (44) also controls the operation of a lubrication system (40) that supplies lubricant to the drive chains.

20 Claims, 6 Drawing Sheets

(56) References Cited

U.S. PATENT DOCUMENTS

| | | | |
|---|---|---|---|
| 7,258,226 B2 * | 8/2007 | Nelson | B65G 21/18 |
| | | | 198/778 |
| 8,302,764 B2 * | 11/2012 | Johnson | B65G 21/18 |
| | | | 198/778 |
| 9,718,623 B2 * | 8/2017 | Eldor | B65G 45/02 |
| 2008/0214343 A1 * | 9/2008 | Assarsson | B65G 17/38 |
| | | | 474/206 |
| 2008/0302638 A1 * | 12/2008 | Malmberg | B65G 21/18 |
| | | | 198/778 |
| 2011/0056806 A1 | 3/2011 | Johnson | |

OTHER PUBLICATIONS

Peterson, S., "How to Choose the Right Control Method for VFDs," <https://www.machinedesign.com/motors-drives/article/21833844/how-to-choose-the-right-control-method-for-vfds> (retrieved Jan. 21, 2021), Oct. 23, 2014, 15 pages.

Ryson International Inc., "Spiral Integration and Maintenance at a Glance," <https://acgconveyors.com/conveyors/wp-content/uploads/2016/09/Ryson-Spiral-Integration-and-maintenance-at- a-Glance.pdf> (retrieved Jan. 21, 2021), Sep. 14, 2016, 4 pages.

The Apollo Group, "Spiral Support: Spiral Conveyor Integration," <https://apollobv.com/uploads/SpiralSupport_Integration.pdf> (retrieved Jan. 21, 2021), Sep. 17, 2019, 3 pages.

* cited by examiner

SPIRAL CONVEYOR DRIVE CONTROL AND LUBRICATION

BACKGROUND

In a typical spiral conveyor system, a self-stacking belt is arranged in and travels in circular tiers from the bottom of the stack to the top and then perhaps in a second stack, the belt travels from the top back down to the bottom of the stack. The bottom belt tier rests on and is driven by inner and outer drive chains that ride on a support rail. The drive chains carry the weight of the belt stack as well as the weight of the work product (often food) loaded on the spiral conveyor belt during thermal processing operations which may involve either heating or cooling of the work product.

The inner and outer drive chains are driven by individual motors. These motors are connected to a single, common variable frequency drive unit to control the speed of the motors. The outer chain is longer than the inner drive chain since the outer support rail is longer than the inner support rail, and as such the outer drive chain travels at a faster rate than the inner drive chain. The gear ratios between the inner and outer drive motors must be extremely accurate to achieve the proper force and speed distribution between the inner and outer drive chains.

To achieve the proper gear ratios between the drive motors, nonstandard gears often must be used that are not only costly, but also often have reduced torque capacity relative to standard gears. Moreover, the inner and outer drive chains may wear at different rates. As a drive chain wears, it elongates. As a consequence, the drive ratio between the inner and outer drive chains may become unbalanced and thereby no longer maintaining a proper force distribution between the inner and outer chains. This will result in one of the motors having to "work harder" than the other motor, which in turn accelerates the wear of the drive chain that is working harder relative to the other drive chain.

Also, when a single variable frequency drive unit is used to drive the inner and outer drive motors, the feedback data from the variable frequency drive line, including, for example torque, amperage, etc., is not useful since it does not relate to a particular motor or drive chain.

It is necessary to lubricate the drive chains during use. The frequency and quantity of lubrication is based on information from the variable frequency drive unit pertaining, for example, to the travel distances of the inner and outer drive chains. However, the frequency and amount of lubrication needed by the inner and outer drive chains may differ due to, for example, the differences in torque load applied to, and in wear being experienced by, the inner and outer drive chains. As a consequence, it is possible that one of the drive chains may be over-lubricated or under-lubricated due to the unevenness of the wear and/or torque load being experienced by the drive chains.

The present disclosure provides a system and method for prolonging the service life of a drive system for a spiral conveyor by controlling the operation of the drive motors in a unique manner and thereby providing relevant data for controlling the lubrication of the drive chains.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an embodiment of the present disclosure, a method is provided for prolonging the service life of a drive system for a spiral conveyor, with the conveyor having an inner drive chain driven by an inner drive motor and an outer drive chain driven by an outer drive motor, the method comprising:

operating the inner drive motor with a first variable frequency drive;

operating of the outer drive motor separately from the inner drive motor with a second variable frequency drive; and controlling the first and second variable frequency drives with a processor to coordinate the manner in which the inner and outer drive chains are driven.

In any embodiment described herein, further comprising controlling the first and second variable frequency drives to coordinate the torque loads on the inner and outer drive motors.

In any embodiment described herein, further comprising controlling the first and second variable frequency drives so that the torque load on one of the inner and outer drive motors is based on the torque load on the other of the inner and outer drive motors.

In any embodiment described herein, further comprising lubricating the inner and outer drive chains based on the data from at least one of the first and second variable frequency drives.

In any embodiment described herein, further comprising lubricating the inner and outer drive chains based on the data from at least one of the first and second variable frequency drives pertaining to the travel distances of the inner and outer drive chains.

In any embodiment described herein, further comprising lubricating the inner and outer drive chains also based on the data from at least one of the first and second variable frequency drives pertaining to the torque loads on the first and second drive chains.

In any embodiment described herein:

wherein the spiral conveyor having an inner rail for supporting the inner drive chain and an outer rail for supporting the outer drive chain, and further comprising delivering lubricant to the inner drive chain via a first lubricant passageway formed in the inner rail and delivering lubricant to the outer drive chain via a second lubricant passageway formed in the outer rail.

In any embodiment described herein, further comprising lining the first and second lubricant passageways.

In any embodiment described herein:

wherein the inner and outer drive chains comprising anti-friction bearings that ride on tracks extending along the inner and outer rails, and further comprising delivering lubricant to the bearing tracks of the inner and outer drive rails.

In any embodiment described herein, further comprising mounting guide strips on the inner and outer rails against which the inner and outer drive chains bear, and further comprising delivering lubricant to the guide strips mounted on the inner and/or outer rail to lubricate the location where the inner and outer drive chains bear against the guide strips.

In accordance with another embodiment of the present disclosure, a drive system for a spiral conveyor comprising:

an inner drive chain driven by an inner drive motor, an outer drive chain driven by an outer drive motor, a first variable frequency drive to operate of the first drive motor;

a second variable frequency drive to drive the second drive motor; and a controller for controlling the first and second variable frequency drives to coordinate the manner which the inner and outer drive chains are driven.

In any embodiment described herein, wherein the controller controlling the first and second variable frequency drives to coordinate the torque loads on the inner and outer drive motor.

In any embodiment described herein, wherein in the controller controlling the first and second variable frequency drives, the torque load on one of the inner and outer drive motors is based on the torque load on the other of the inner and outer drive motors.

In any embodiment described herein, further comprising a lubricating system for lubricating the inner and outer drive chains, the lubricating system comprising a lubrication unit for delivering lubricant to the first and second drive chains based on data from at least one of the first and second variable frequency drives.

In any embodiment described herein, wherein the lubrication unit delivering lubricant to the inner and outer drive chains based on data from at least one of the first and second variable frequency drives pertaining to the travel distances of inner and outer drive chains.

In any embodiment described herein, wherein the lubrication unit delivering lubricant to the inner and outer drive chains based on data from at least one of the first and second variable frequency drives pertaining to the torque loads on the first and second drive chains.

In any embodiment described herein:

wherein the spiral conveyor having an inner rail for supporting the inner drive chain and an outer rail for supporting the outer drive chain, and the lubricating unit delivering lubricant to the inner drive chain via a lubricant passageway formed in the inner rail and delivering lubricant to the outer drive chain via a lubricant passageway formed in the outer rail.

In any embodiment described herein, wherein the lubricant passageways in the inner rail and the outer rail are lined with delivery tubing.

In any embodiment described herein, wherein:

the inner and outer drive chains comprising anti-friction bearings that ride on tracks extending along the inner and outer rails, and the lubricating unit delivering lubricant to the bearing tracks of the inner and outer rails.

In any embodiment described herein, wherein:

further comprising guide strips mounted on the inner and outer rails against which the inner and outer drive chains bear, and the lubrication unit delivering lubricant to the location where the inner and outer drive chains bear against the guide strips.

In any embodiment described herein, wherein a controller is incorporated into at least one of the first and second variable frequency drives.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "back," "ahead," "behind," "upward," "downward," "above," "below," "top," "bottom," "right-hand," left-hand," "in," "out," "extended," "advanced," "retracted," "proximal," "distal," "central," etc. These references and other similar references in the present application are only to assist in helping describe and understand the present invention and are not intended to limit the present invention to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out. If a quantitative value is needed to render the applicable parameter sufficiently definite, the applicable parameter is within five percent (5%) of the designated parameter value.

In the following description, various embodiments of the present disclosure are described. In the following description and in the accompanying drawings, the corresponding systems assemblies, apparatus and units may be identified by the same part number, but with an alpha suffix. The descriptions of the parts/components of such systems assemblies, apparatus, and units that are the same or similar are not repeated so as to avoid redundancy in the present application.

The systems, apparatus and methods disclosed in the present application and defined in the present claims, though specifically applicable to food products or food items, may also be used outside of the food area. Accordingly, the present application and claims reference "work products" and "workpieces," which terms are synonymous with each other. It is to be understood that references to work products and workpieces also include food, food products, food pieces, and food items.

Figure 1:
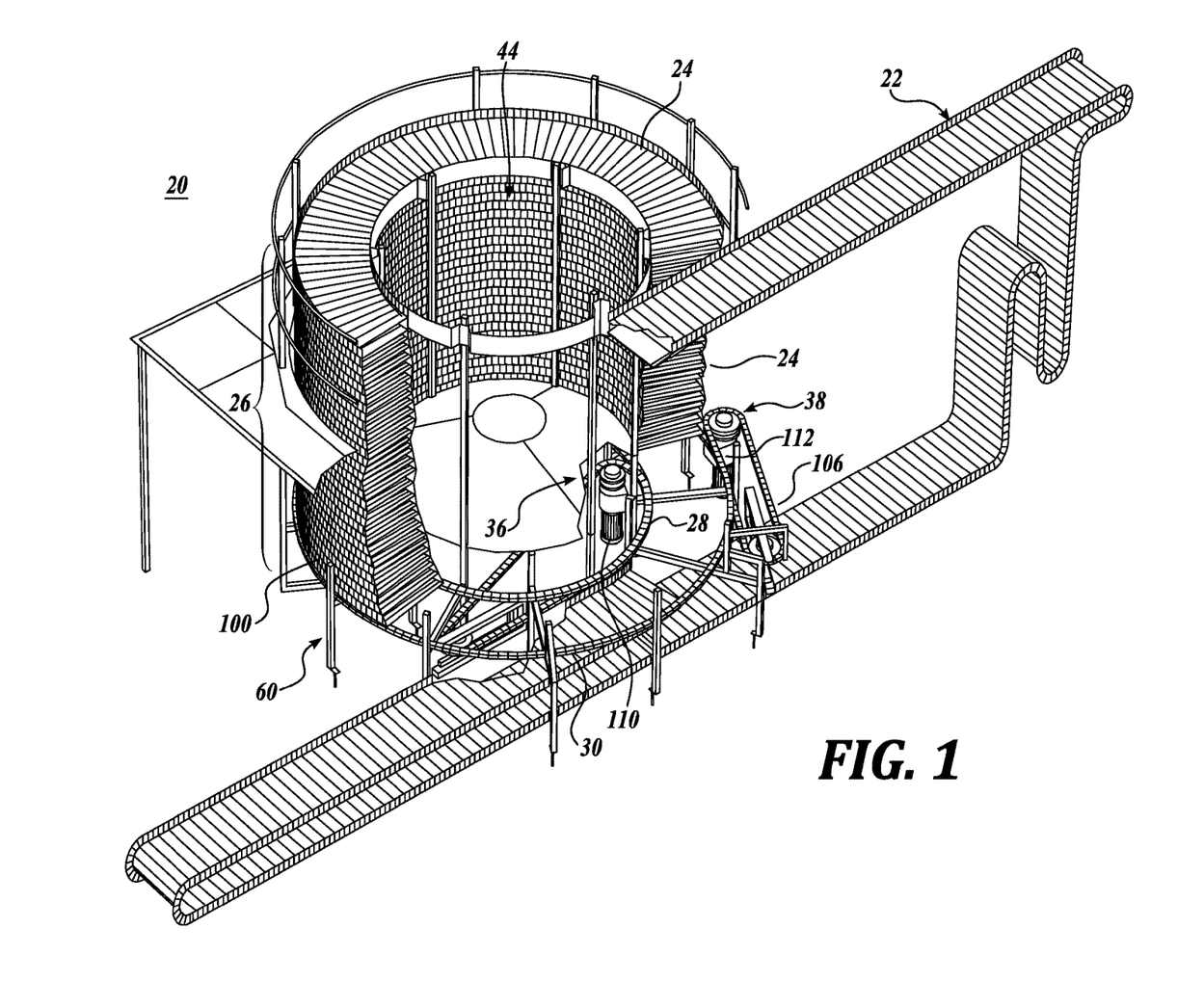
FIG. 1 is an isometric view of a spiral stacking conveyor belt system including a self-stacking conveyor belt and a drive system for driving the conveyor belt in accordance with embodiments of the present disclosure.
Figure 3A:
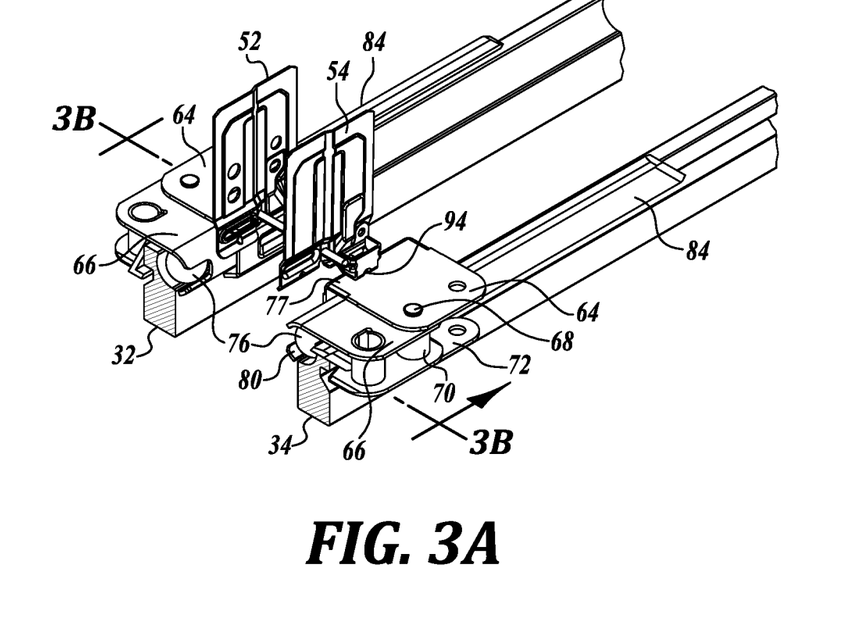
FIG. 3A is an enlarged isometric view showing segments of the inner and outer drive chains that support and propel the lower tier of the conveyor belt on support rails.
Figure 3B:
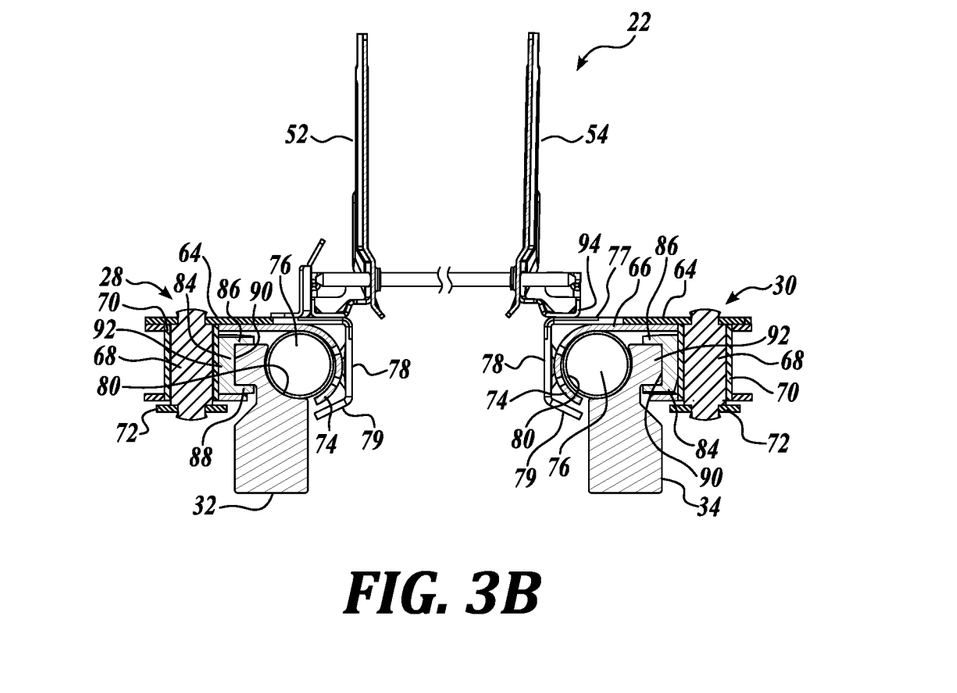
FIG. 3B is an end view of FIG. 3A.

Referring initially to FIGS. 1 and 3B, embodiments of the present disclosure are directed to self-stacking conveyor belt system 20 wherein the conveyor belt 22 travels in circular tiers 24 from the bottom of a spiral stack 26 to the top. In perhaps a second stack, the conveyor belt travels from the top back down to the bottom of the stack. The bottom conveyor belt tier rests on and is driven by inner and outer drive chains 28 and 30, respectively. The inner and outer drive chains 28 and 30 are supported on and ride along support rails 32 and 34, respectively. The inner and outer drive chains 28 and 30 are driven by a drive system 35 composed of inner and outer drive systems 36 and 38, respectively. A lubrication system 40 provides lubricant to the inner and outer drive chains 28 and 30. A control system 42 controls the operation of the inner and outer drive systems 36 and 38 as well as the lubrication system 40.

Conveyor Belt

Examples of spiral stacking conveyor belts are shown and described in U.S. Pat. No. 3,938,651, issued to Alfred et al. and U.S. Pat. No. 5,803,232 issued to Frodeberg, the disclosures of which are hereby expressly incorporated by reference. However, it should be appreciated that other suitable spiral belt assemblies are also within the scope of the present disclosure.

Referring to FIG. 1, when formed as a spiral stack 26, the pervious conveyor belt 22 is configured into a plurality of superimposed flights or tiers 24 that are stacked on top of each other. Each tier 24 of the stack 26 forms a pervious annulus, through which gaseous thermal processing medium may travel, whether for cooking or freezing. When formed in a spiral stack 26, the plurality of tiers 24 creates an inner cylindrical channel 44, through which the gaseous medium may also travel. The work products travel on the conveyor belt 22 and are treated by the thermal processing medium. An exemplary spiral stack 26 may have any number of tiers 24, typically in the range of about 8 to 45 tiers.

Figure 4:
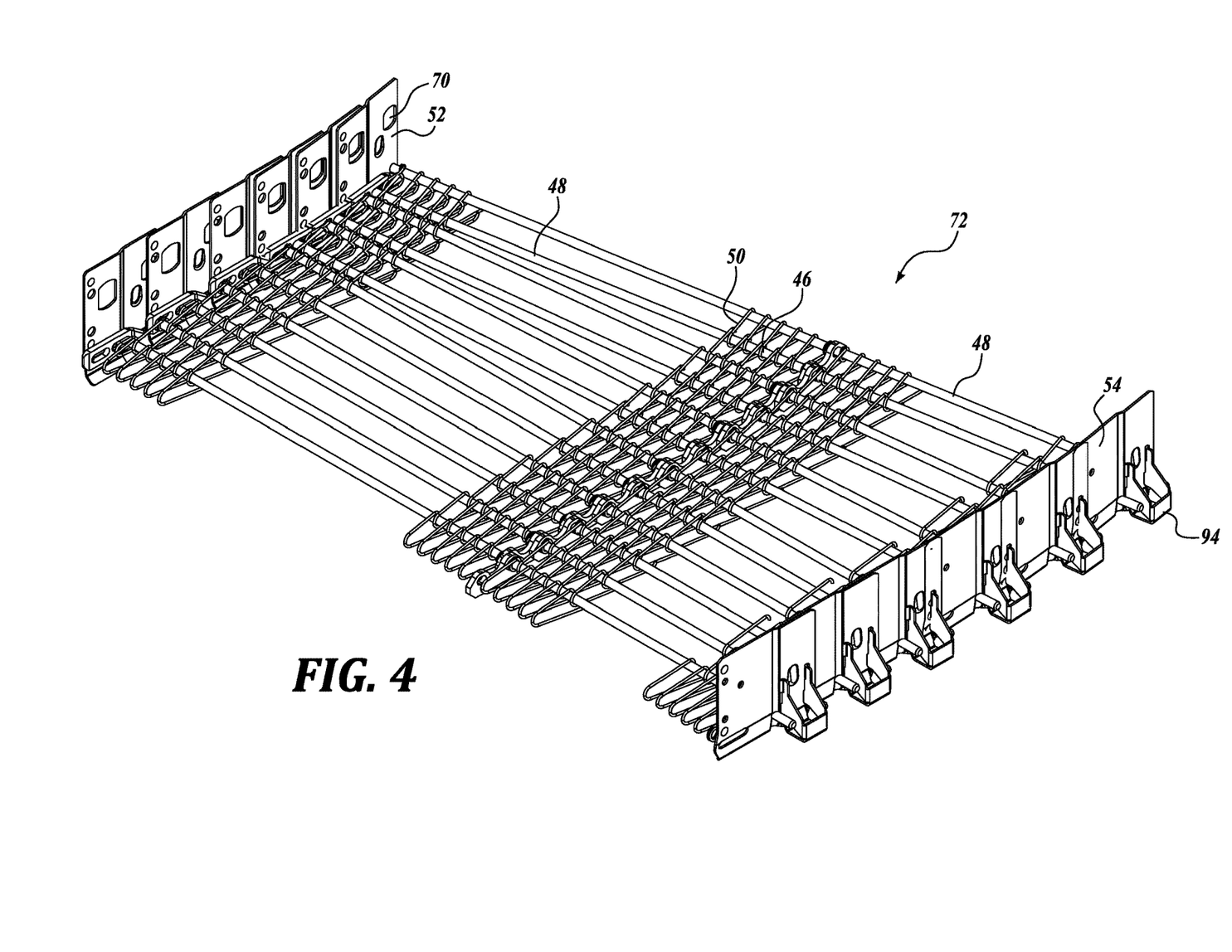
FIG. 4 is a fragmentary isometric view of a section of a spiral conveyor.
Figure 5:
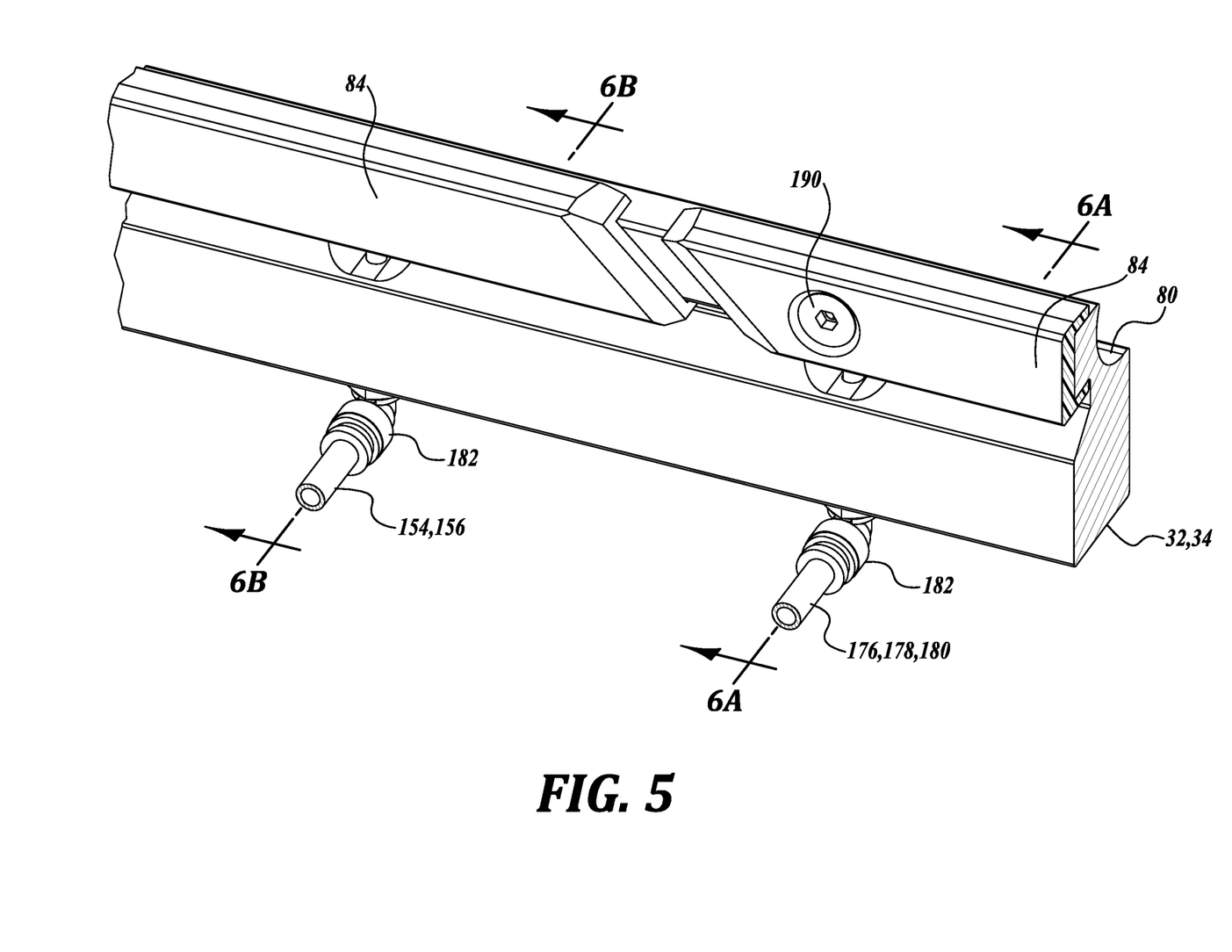
FIG. 5 is an enlarged isometric view illustrating the delivery of lubrication to the support rails.
Figure 6A:
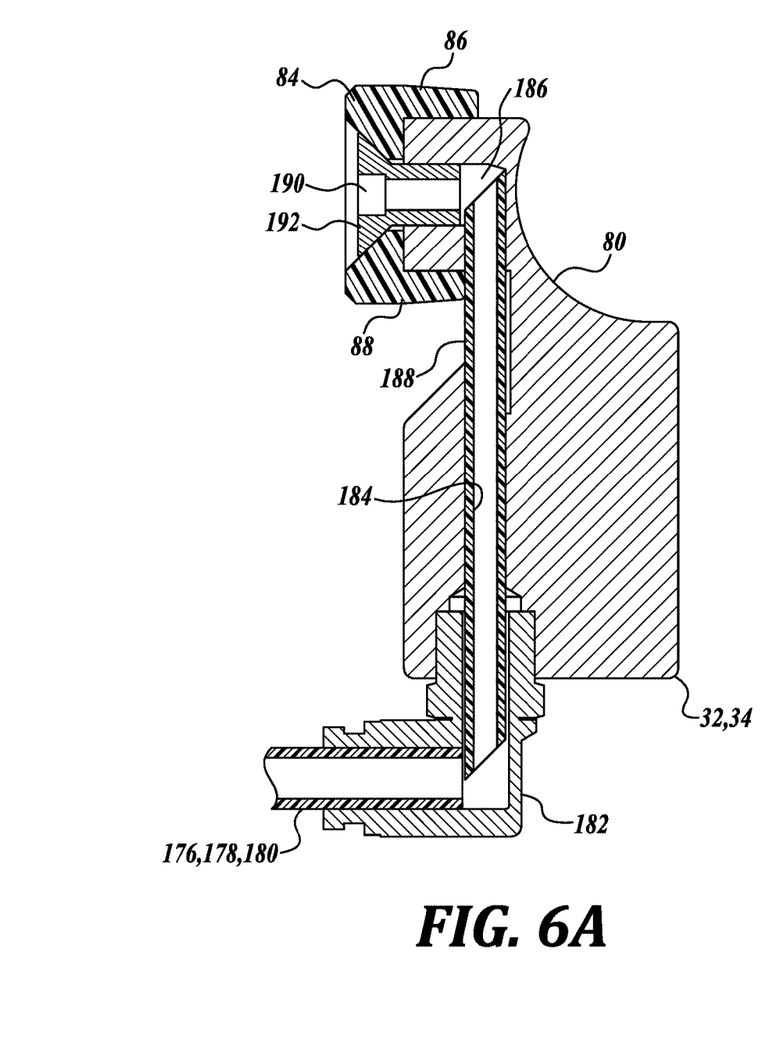
FIG. 6A is a cross-sectional view of FIG. 5 taken along lines 6A-6A thereof.
Figure 6B:
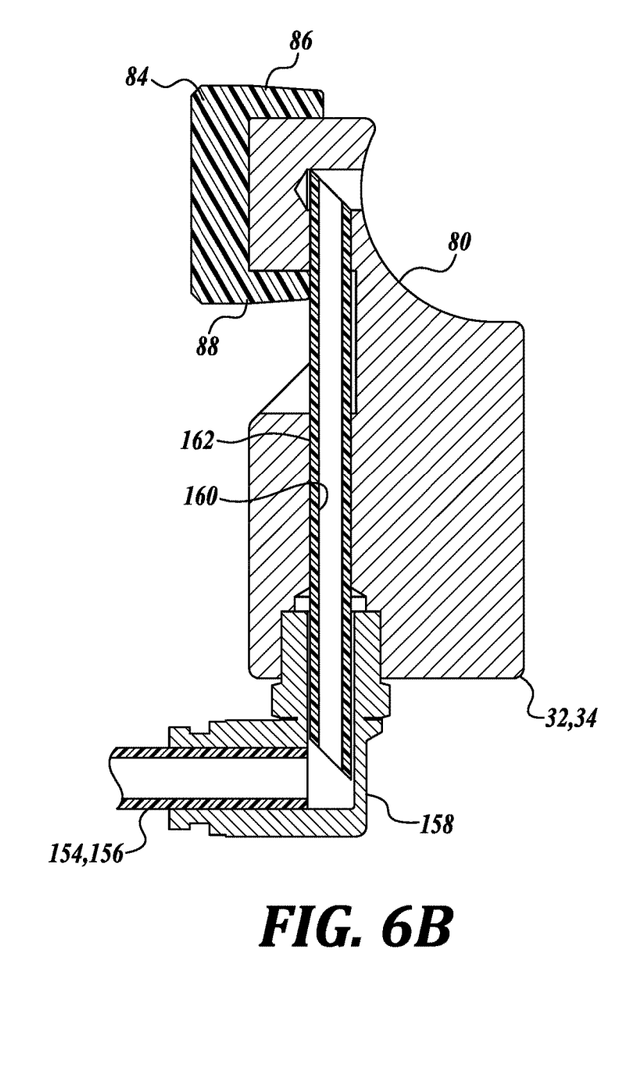
FIG. 6B is a cross-sectional view of FIG. 5 taken along lines 6B-6B thereof.

Referring to FIG. 4, as a non-limiting example, the conveyor belt 22 may be in the form of a pervious belt mesh 46 for conveying workpieces. Transverse rods 48 interconnect intermediate wire links 50 as well as formed inner and outer links 52 and 54 positioned at the ends of the transverse rods 48. The inner and outer links 52 and 54 are positioned at the ends of rods 48 and are configured to enable the spiral stacking of the belt tiers 24. In this regard, the inner links 52 collapse when the belt 22 travels in a curved or circular path, and for interconnection with the belt drive. The inner and outer links 52 and 54 interact with and are driven by inner and outer drive chains 28 and 30, as described below.

Drive Chains/Support Rails

Referring specifically to FIGS. 1, 2, 3A and 3B, the inner drive chain 28 is supported by an inner support rail 32, and the outer drive chain 30 is supported by an outer support rail 34. The inner support rail 32 and outer support rail 34 are in turn mounted on a support stand structure 60 positioned about the circumference of the circular paths of rails 34 and 36.

Next, referring specifically to FIGS. 3A and 3B, each drive chain 28 and 30 is composed of outer links 64 that overlap inner links 66. The links 64 and 66 are interconnected by vertical spindles 68 over which sleeves 70 are engaged. The ends of the spindles are attached to the links 64 and 66 at the top of the roller and a lower chain bar 72 at the bottom of the link roller. The chain bar 72 is of a length that is substantially the same as the length of the inner link 66. The sleeves 70 are welded to the top and bottom flanges of the inner links 66.

Each inner link 66 extends along a support rail 32 or 34 and includes a downwardly extending edge portion 74 formed in a radius, which conforms to the radius of ball rollers 76, which serve as anti-frictional rolling elements between the support rails 32 and 34 and the inner and outer drive chains 28 and 30, respectively. The inner and outer support rails 32 and 34 define a roller race 80 for receiving and supporting anti-friction bearings in the form of ball rollers 76 in cooperation with the inner link 66. The roller balls 76 roll along the support rails 32 and 34 while transferring the load of the belt stack 26 onto the rails 32 and 34. The edge portion 74 of the inner link holds the ball roller 76 captive on roller race 80. It is to be understood that other types of anti-friction bearings can be utilized, such as roller bearings.

As most clearly shown in FIG. 3B, U-shaped guide strips 84 form an outwardly directed vertical surface to bear against the sleeves 70 as the drive chains 28 and 30 travel along the support rails 32 and 34. The guide strips 84 are mounted on the support rails 32 and 34. The guide strips 84 include upper and lower flanges 86 and 88 that, together with the inward face 90 of the guide strip, engage over and are fixed to the guide rim portion 92 of the support rails 32 and 34. The guide strip 84 is typically composed of a sacrificial material with respect to sleeves 70 and are mounted to the guide rims 92 by any appropriate means. Nonetheless, for longevity, it is important that the guide strips 84 be properly lubricated.

The outer links 64, connected between adjacent inner link 66, include a top substantially planar bearing surface 77 overlapping the top surfaces of the inner link 66. The outer links 64 also include an inward vertical section 78 which is spaced inwardly of the adjacent portion of the inner link edge portion 74. A diagonal edge portion extends downwardly and inwardly from the lower edge of the vertical section 78 to underlie the adjacent portion of the inner link edge portion 74.

Drive System

The bottom tier 24 of the spiral stack 26 is supported by and driven forwardly by the inner and outer drive chains 28 and 30. As seen in FIG. 3B, link feet 94, positioned at the bottom exterior of inner and outer links 52 and 54, bear against the upper surface of outer links 64 and thereby are supported by the inner and outer drive chains 28 and 30, as well as being carried forwardly by the movement of the drive chains.

As noted above, the conveyor belt 22 is driven by the drive system 35 which includes an inner drive system 36 and an outer drive system 38. The inner drive system 36 includes an inner drive station 100, an inner chain 28, and an inner chain tensioner take-up 102. The outer drive system 38 includes an outer drive station 104, an outer drive chain 30, and an outer drive chain tensioner take-up 106. The inner chain tensioner take-up 102 and the outer chain tensioner take-up 106 operate in a standard manner to maintain a desired tension level in the inner and outer drive chains 28 and 30.

Figure 2:
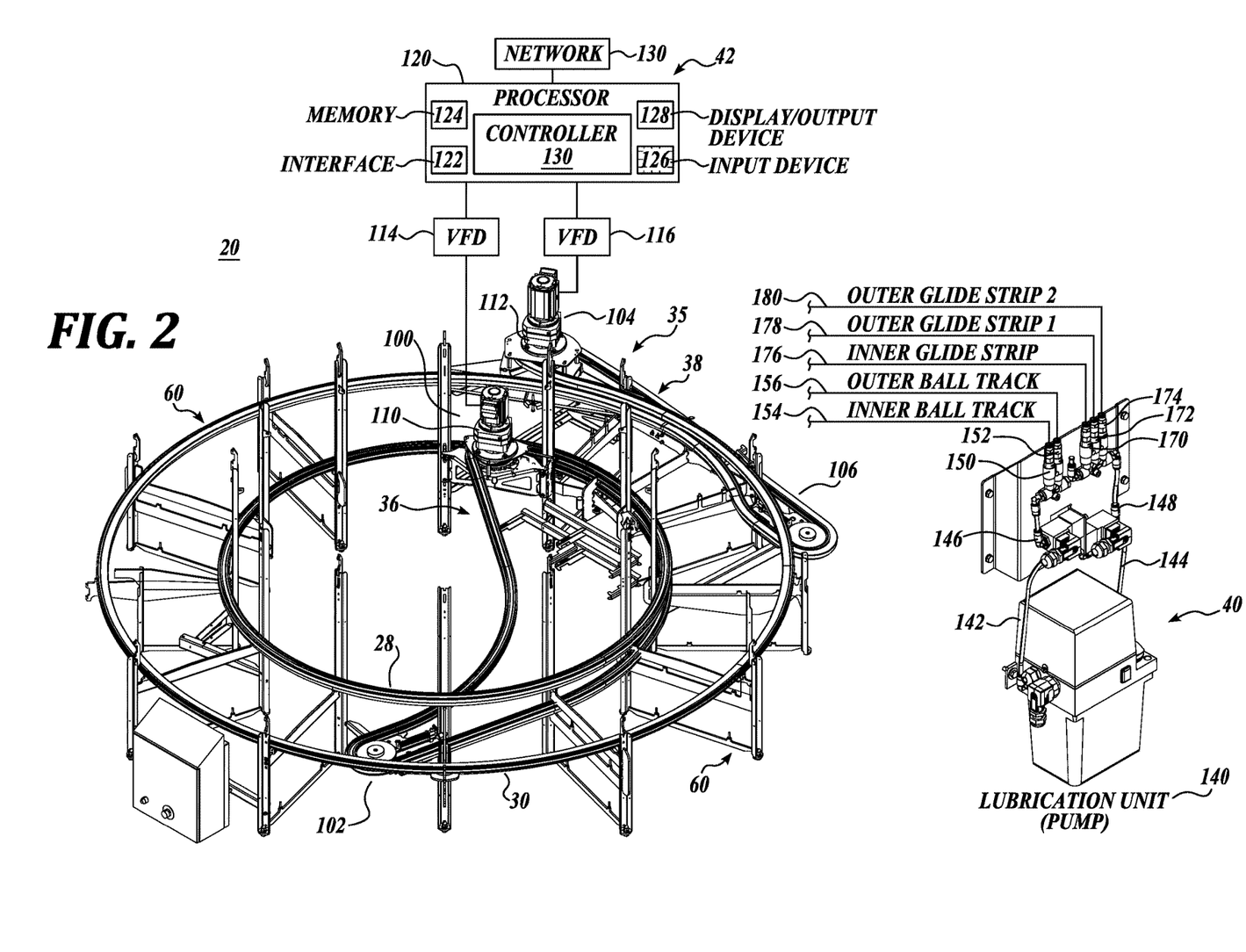
FIG. 2 is an isometric view of the conveyor belt system of FIG. 1 showing the drive system for the inner and outer drive chains as well as the lubricating system for lubricating the inner and outer drive chains.

At the inner drive station 100, an inner drive motor 110 drives the inner chain 28, while at the outer drive station 104 an outer drive motor 112 drives the outer chain 30. A drive gear, not shown, is powered by each of the drive motors 110 and 112 with the drive gear meshing with the sleeved spindles 68 of the inner and outer drive chains 28 and 30. As shown in FIG. 2, the inner and outer drive chains 28 and 30 wrap around the drive gears so as to maintain positive engagement with the drive gears. As the drive gears drive the drive chains 30 and 32, such drive chains support and carry the lower tier of the spiral stack 26 causing the conveyor belt to progress upwardly along the stack 26.

Each of the drive motors 110 and 112 is controlled by a separate variable frequency drive unit 114 and 116, respectively, thereby to drive the drive chains at desired torque levels and speeds. It will be appreciated that since the outer chain 30 is longer than the inner chain 28, it is necessary to drive the outer chain at a faster rate than the inner chain for the proper operation of the conveyor belt 22.

The variable frequency drives 114 and 116 are controlled by the control system 42 which includes a processor 120 having an interface 122 for receiving signals and information from the variable frequency drives 114 and 116 as well as from the lubrication system 40, as described below. A memory unit 124 is provided for storing information regarding the processor 120. A keyboard, smart screen, or other input device 126 is provided to enable an operator to communicate with the control system 42. Also, a display or other output device is provided to convey information from the processor through the operator, and vice versa, pertaining to the functioning and control of the system 20.

The control system may include a controller unit 130, which may be in the form of a programmable logic controller or other type of controller, for instance, for controlling the operation of the variable frequency drives as well as the lubricating system 40. The control system 42 may be connected to a network 130. Also, rather than employing a local processor 120, a network computing system can be used.

Using the control system 42, the variable frequency drives 114 and 116 operate to drive the inner and outer drive chains 28 and 30 at a desired torque level and speed for the thermal processing of the work products being carried by the conveyor system 20. Using the variable frequency drive 114 of the inner drive station 100 as the "master," the torque level and speed of the outer drive motor 112 is determined by the control system 42 and controlled by the variable frequency drive 116. In this regard, the speed of the outer drive chain is controlled to coordinate the torque load on the outer drive chain based on the torque load being applied to the inner drive chain. In this manner, the inner and outer drive chains are driven at an optimum speed so as to not apply unbalanced loads between the inner and outer drive chains. The end result is that the inner and outer drive chains "work" at the same or at substantially the same, level.

It is to be understood that variable frequency drive 116 of the outer drive station 104 can serve as the "master" so that the torque levels and speed of the inner drive motor 110 is determined by the control system 42 and controlled by the variable frequency drive 114. Also, it is to be understood that a control system having the necessary functions of control system 42 can be integrated into one or both of the variable frequency drive units 114 and 116.

Further, by separately controlling the inner and outer drive motors 110 and 112 with separate variable frequency drive units 114 and 116, the operation, including the speed, of the motors can be independently controlled to compensate for wear of the inner and outer drive chains 28 and 30. As mentioned above, such wear may not be uniform. Moreover, since the outer drive chain is longer than the inner drive chain, the elongation of the drive chains due to wear thereon cannot expect to be uniform over time. Typically, one or other of the two drive chains will elongate more than the other drive chain due to wear. Nonetheless, by individually controlling the drive motors with individual variable frequency drive units 114 and 116, such difference in chain wear can be accommodated and compensated for.

Lubrication System

As mentioned above, it is important to lubricate the drive chains 30 and 32 so as to reduce the torque loads required by the drive stations 100 and 104 to drive the chains, and also to minimize wear on the drive chains. The weight of the conveyor belt 22, as well as the weight of the work products being carried by the belt, place high levels of load on the drive chains in a vertical direction, as well as laterally in part due to the fact that the ball rollers 76 are not positioned directly under the belt feet 94. As such, both vertical and lateral forces are imposed on the roller balls 76, as well as on the guide strips 84.

To reduce, or at least to seek to control, such forces, lubricant is supplied to the drive chains, and specifically to the ball rollers as well as to the guide strips. The lubrication system of the present disclosure seeks to apply an appropriate level of lubrication to the ball rollers or other antifriction bearing being used, as well as to the guide strips of the inner and outer support rails.

Referring to FIGS. 2, 5, 6A and 6B, lubrication system 40 includes a lubricating unit 140 which includes a pump for pumping lubricant out through lines 142 and 144 to control valves 146 and 148. From valve 146, lubricant is transmitted to individual valves 150 and 152 which directs lubricant to the inner and outer support rails 32 and 34 for delivery to the roller race 80 of the rails. In this regard, the lubricant is directed to the support rails 32 and 34 by lines 154 and 156 to an elbow nipple 158 connected to the lower end of a vertical passageway 160 formed in the support rail 32/34. Because the passageway 160 may break out of the rail 32/34, a liner 162 in the form of a tube extends upwardly through the passageway 160 to a short horizontal delivery outlet 164 which intersects with an upper portion of roller race 80. It will be appreciated that by this construction, lubricant is directed to the ball rollers without dripping downwardly onto the ball rollers from above as in past lubrication systems.

Referring specifically to FIG. 2, lubricant is directed to the guide strips 84 of the inner and outer support rails 32 and 34 via control valves 170, 172 and 174, which are interconnected to primary control valve 148 by a feed line. From the valves 170, 172 and 174, lubricant is directed to the support rails 32 and 34 by delivery lines 176, 178 and 180, which terminate at elbow nipples 182 connected to a vertical passageway 184 extending through the support rails 32 and 34 at the bottom of the support rails. The upper end of the passageway 184 terminates at a horizontal outlet 186. Since the passageway 184 may break out to the exterior of the rail 32, 34, a liner in a form of a tube 188 extends through the passageway 184 between the delivery lines 176, 178 and 180 at the bottom end and an outlet 186 at the upper end of the liner.

A flared fitting 190 is disposed in the horizontal outlet 186 to deliver the lubricant to the surface of the guide strip 84. The fitting 190 includes a hollow shank portion that is engaged into the outlet 186. The shank can be pressed into the outlet 186 or threaded therein. The fitting 190 includes a flared head section 192 that will remain intact even if the wear strip 84 is worn down or otherwise damaged. This will help ensure that lubricant continues to reach the exterior of the wear strip.

The operation of the lubrication unit 140 is controlled by the control system 42, which in turn receives data from one or both of the variable frequency drive units 114 and 116. The control system 42 analyzes such data and then determines when and how much lubricant is to be supplied to the roller races 80 and the wear strips 84, and thereby controls the operation of the lubrication system 140 accordingly. Such determination by the control system may be based on various factors, including the travel length of the drive chains 28 and 30 past the drive motors or the torque loads applied to the drive chains by the drive motors, as well as the age of the drive chains, the age of the guide strips 84, the temperature, humidity, and other condition of the environment within which the conveyor system 20 operates, as well as other factors.

As one possible example, if the variable frequency drive indicates that one of the drive motors has had to increase the torque level applied to the chain, lubrication of the drive chain in question and/or the guide strip in question may be initiated by the control system 42. In the past, this information would not be available since a singular variable frequency drive has been used to control both of the drive motors. However, with the conveyor system 20 of the present disclosure, which utilizes individual variable frequency drive units for each of the drive motors, information pertaining to the condition of each of the inner and outer drive chains 28 and 30 is now available. This information can be utilized to optimally lubricate the inner and outer drive chains 28 and 30 as well as the guide strips 84 for the inner and outer support rails 32 and 34. As a consequence, the conveyor system of the present disclosure is capable of avoiding unnecessary oil consumption, as well as reducing wear on the drive chains and guide strips. In addition, wear can be reduced on the drive motors and the drive gears used to drive the inner and outer drive chains. Further, such drive gears can be protected from being overloaded due to one of the drive gears having to apply a significantly higher operating torque than the other drive gear due to a differential in wear between the inner and outer drive chains.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for prolonging the service life of a drive system for a spiral conveyor, the conveyor having an inner drive chain driven by an inner drive motor and an outer drive chain driven by an outer drive motor, the method comprising:
    operating the inner drive motor with a first variable frequency drive to drive the inner drive chain that supports and drives a bottom tier of a spiral conveyor;
    operating the outer drive motor separately from the inner drive motor with a second variable frequency drive to drive the outer drive chain that supports and drives the bottom tier of the spiral conveyor; and
    controlling the first and second variable frequency drives with a processor to coordinate the driving of the inner and outer drive chains by the inner and outer drive motors, respectively.

2. The method of claim 1, further comprising controlling the first and second variable frequency drives to coordinate the torque loads on the inner and outer drive motors.

3. The method of claim 2, further comprising controlling the first and second variable frequency drives so that the torque load on one of the inner and outer drive motors is based on the torque load on the other of the inner and outer drive motors.

4. A method for prolonging the service life of a drive system for a spiral conveyor, the conveyor having an inner drive chain driven by an inner drive motor and an outer drive chain driven by an outer drive motor, the method comprising:
    operating the inner drive motor with a first variable frequency drive;
    operating the outer drive motor separately from the inner drive motor with a second variable frequency drive;
    controlling the first and second variable frequency drives with a processor coordinating the manner in which the inner and outer drive chains are driven; and
    further comprising lubricating the inner and outer drive chains based on the data from at least one of the first and second variable frequency drives.

5. The method of claim 4, further comprising lubricating the inner and outer drive chains based on the data from at least one of the first and second variable frequency drives pertaining to the travel distances of the inner and outer drive chains.

6. The method of claim 4, further comprising lubricating the inner and outer drive chains based on data from at least one of the first and second variable frequency drives pertaining to the torque loads on the first and second drive chains.

7. The method according to claim 4:
    wherein the spiral conveyor having an inner rail for supporting the inner drive chain and an outer rail for supporting the outer drive chain, and
    further comprising delivering lubricant to the inner drive chain via a first lubricant passageway formed in the inner rail and delivering lubricant to the outer drive chain via a second lubricant passageway formed in the outer rail.

8. The method according to claim 7, further comprising lining the first and second lubricant passageways.

9. The method according to claim 7:
    wherein the inner and outer drive chains comprising anti-friction bearings that ride on tracks extending along the inner and outer rails, and further comprising delivering lubricant to the tracks of the inner and outer drive rails.

10. The method according to claim 7:
further comprising guide strips mounted on the inner and outer rails against which the inner and outer drive chains bear, and
further comprising delivering lubricant to the guide strips mounted on the inner and/or outer rail to lubricate the location where the inner and outer drive chains bear against the guide strips.

11. A drive system for a spiral conveyor in the form of a plurality of tiers supported by a bottom tier, the drive system comprising:
an inner drive chain for supporting and driving the bottom tier, the inner drive chain driven by an inner drive motor,
an outer drive chain for supporting and driving the bottom tier, the outer drive chain driven by an outer drive motor,
a first variable frequency drive to drive the first drive motor;
a second variable frequency drive to drive the second drive motor; and
a controller for controlling the first and second variable frequency drives to coordinate the driving of the inner and outer drive chains by the inner and outer drive motors, respectively.

12. The drive system of claim 11, wherein the controller controlling the first and second variable frequency drives coordinates the torque loads on the inner and outer drive motor.

13. The drive system of claim 12, wherein in the controller controlling the first and second variable frequency drives, the torque load on one of the inner and outer drive motors is based on the torque load on the other of the inner and outer drive motors.

14. A drive system for a spiral conveyor comprising:
an inner drive chain driven by an inner drive motor,
an outer drive chain driven by an outer drive motor,
a first variable frequency drive to operate the first drive motor;
a second variable frequency drive to drive the second drive motor;
a controller for controlling the first and second variable frequency drives to coordinate the manner in which the inner and outer drive chains are driven; and
further comprising a lubricating system for lubricating the inner and outer drive chains, the lubricating system comprising a lubrication unit for delivering lubricant to the first and second drive chains based on data from at least one of the first and second variable frequency drives.

15. The drive system according to claim 14, wherein the lubrication unit delivering lubricant to the inner and outer drive chains based on data from at least one of the first and second variable frequency drives pertaining to the travel distances of inner and outer drive chains.

16. The drive system according to claim 14, wherein the lubrication unit delivering lubricant to the inner and outer drive chains based on data from at least one of the first and second variable frequency drives pertaining to the torque loads on the first and second drive chains.

17. The drive system according to claim 14:
wherein the spiral conveyor having an inner rail for supporting the inner drive chain and an outer rail for supporting the outer drive chain, and
the lubricating unit delivering lubricant to the inner drive chain via a lubricant passageway formed in the inner rail and delivering lubricant to the outer drive chain via a lubricant passageway formed in the outer rail.

18. The drive system according to claim 14, wherein:
the inner and outer drive chains comprising anti-friction bearings that ride on tracks extending along the inner and outer rails, and
the lubricating unit delivering lubricant to the tracks of the inner and outer rails.

19. The drive system according to claim 14:
further comprising guide strips mounted on the inner and outer rails against which the inner and outer drive chains bear, and
the lubrication unit delivering lubricant to the location where the inner and outer drive chains bear against the guide strips.

20. The drive system according to claim 11, wherein the controller is incorporated into at least one of the first and second variable frequency drives.

* * * * *